United States Patent [19]

Azuma et al.

[11] Patent Number: 4,540,480
[45] Date of Patent: Sep. 10, 1985

[54] PROCESS FOR PREPARING HYDROGENATED PETROLEUM RESIN

[75] Inventors: Noriharu Azuma, Suita; Shigeru Suetomo, Kobe, both of Japan

[73] Assignee: Arakawa Kagaku Kogyo Kaubshiki Kaisha, Osaka, Japan

[21] Appl. No.: 544,230

[22] Filed: Oct. 21, 1983

[30] Foreign Application Priority Data

Oct. 23, 1982 [JP] Japan ............................. 57-186496
Jan. 26, 1983 [JP] Japan ............................... 58-11684

[51] Int. Cl.³ ........................... C10C 3/00; C10C 3/02
[52] U.S. Cl. ...................................... 208/44; 208/22; 208/143; 525/327.9; 525/370
[58] Field of Search ........................ 208/44, 22, 143; 525/327.9, 370

[56] References Cited

U.S. PATENT DOCUMENTS

| | | | |
|---|---|---|---|
| 2,824,860 | 2/1958 | Aldridge et al. | 525/325.9 |
| 3,040,009 | 6/1962 | Wadsworth et al. | 525/327.9 |
| 3,356,660 | 12/1967 | Moritz et al. | 525/327.9 |
| 3,362,939 | 1/1968 | Moritz et al. | 525/327.9 |
| 3,639,366 | 2/1972 | Broca et al. | 525/327.9 |
| 3,996,304 | 12/1976 | Rausch | 208/143 |
| 4,014,783 | 3/1977 | Rausch | 208/143 |
| 4,115,255 | 9/1978 | Hayes et al. | 208/143 |
| 4,284,835 | 8/1981 | Kim et al. | 208/143 |
| 4,312,741 | 1/1982 | Jacquin | 208/143 |
| 4,328,090 | 5/1982 | Stuckey, Jr. et al. | 208/44 |

FOREIGN PATENT DOCUMENTS

| | | | |
|---|---|---|---|
| 865815 | 3/1971 | Canada | 208/44 |
| 107391 | 9/1976 | Japan | 525/327.9 |
| 821698 | 10/1959 | United Kingdom | 525/327.9 |
| 2061961 | 6/1981 | United Kingdom | 525/370 |

Primary Examiner—D. E. Gantz
Assistant Examiner—Helane Myers
Attorney, Agent, or Firm—Antonelli, Terry & Wands

[57] ABSTRACT

A process for preparing a hydrogenated petroleum resin in which a petroleum resin having an aromatic ring is hydrogenated by introducing hydrogen gas and the molten petroleum resin from the upper or lower part of a vertical reactor to parallel-currently pass them through a fixed bed of a supported catalyst containing platinum and/or rhodium which may be used in combination with at most 50% by weight of a metal selected from palladium, ruthenium and rhenium.

13 Claims, No Drawings

PROCESS FOR PREPARING HYDROGENATED PETROLEUM RESIN

BACKGROUND OF THE INVENTION

The present invention relates to a process for preparing a hydrogenated petroleum resin, and more particularly to a process for hydrogenating a petroleum resin in a high efficiency in a shortened reaction time by concurrently passing a hydrogen gas and a molten petroleum resin through a fixed bed of a supported particular metal catalyst.

So-called petroleum resins prepared by polymerizing a thermal cracking product of petroleum naphtha in the presence of a Friedel-Crafts catalyst have been employed mainly as a tackifier for adhesives and a modifier for plastics. Petroleum resins suitable for these purposes are usually those having a softening point of 60° to 140° C. and a molecular weight of 600 to 10,000. In particular, hydrogenated products of such petroleum resins are suitable for these purposes, because they have good weatherability, color, stability and compatibility with rubbers, polyolefins and ethylene-vinyl acetate copolymers. However, these petroleum resins are hard to be hydrogenated as compared with the raw material monomers of the resins. Although the reason has not yet been sufficiently made clear, in general the higher the molecular weight of the petroleum resins, the harder the hydrogenation. Particularly, in case of converting the benzene ring of the petroleum resins into the cyclohexane ring, the hydrogenation reaction is hard to proceed unless the reaction is conducted under severe conditions, namely at high temperature and pressure for a long time in the presence of a large amount of a catalyst.

A nickel catalyst and a platinum catalyst in the form of powder are hitherto known as catalysts for hydrogenation of petroleum resins. Also, a method using a slurry reactor, e.g. a batchwise suspension bed system or a flow type suspension bubble column system, has been generally adopted as a hydrogenation method. In these conventional processes, a powdery catalyst is suspended in a molten petroleum resin, and accordingly a filtration step is essential for separating the catalyst from the hydrogenated petroleum resin after the hydrogenation. However, in case of a petroleum resin having a high softening point, namely having a high melt viscosity, the hydrogenation product must be recovered by once diluting it with an organic solvent such as xylene or toluene, filtering off the catalyst particles and evaporating the organic solvent from the filtrate, because of difficulty in filtration of the product in a molten state or inconvenience in procedure such as requiring a long time for filtration. Accordingly, the steps of the conventional processes are very complicated, and moreover, this results in increase in cost. In particular, in case of using a platinum catalyst which is expensive, the economical loss is large, since the catalyst is not quantitatively recovered. In view of the above-mentioned problems, an industrially, economically advantageous process for the hydrogenation of petroleum resins has been desired.

It is an object of the present invention to provide a process for preparing a hydrogenated petroleum resin which does not require a step for separating a catalyst from the product by filtration as in conventional processes.

A further object of the invention is to provide a continuous process for hydrogenating a petroleum resin utilizing a fixed catalyst bed.

A still further object of the invention is to provide a process for hydrogenating a petroleum resin in a high degree of hydrogenation in a shortened period of time.

These and other objects of the present invention will become apparent from the description hereinafter.

SUMMARY OF THE INVENTION

In accordance with the present invention, there is provided a process for preparing a hydrogenated petroleum resin which comprises parallel-currently passing hydrogen gas and a molten petroleum resin having an aromatic ring through a fixed bed of a supported catalyst containing as a catalytically active material a metal selected from the group consisting of platinum, rhodium. a combination thereof and a combination of at least one of platinum and rhodium with at least one of palladium, ruthenium and rhenium.

DETAILED DESCRIPTION

The petroleum resin having an aromatic ring used in the present invention includes homopolymers of aromatic hydrocarbons having double bond in the side chain, homopolymers of aromatic hydrocarbons having double bond in the condensed ring, and polymerization products of a mixture of such aromatic hydrocarbons and other olefins. These petroleum resins are prepared in a known manner by polymerizing the aromatic hydrocarbon with or without an olefin in the presence of a Friedel-Crafts catalyst such as aluminum chloride or boron trifluoride. Examples of the aromatic hydrocarbon are, for instance, styrene, α-methylstyrene, vinyl toluene, vinyl xylene, propenylbenzene, indene, methylindene, ethylindene, and the like. Examples of the olefin are, for instance, butene, pentene, hexene, heptene, octene, butadiene, pentadiene, cyclopentadiene, dicyclopentadiene, octadiene, and the like.

It is necessary to employ a fixed bed catalyst which supports a specific metal as a catalytic material, since petroleum resins, particularly petroleum resins having an aromatic ring, are hard to be hydrogenated and accordingly a high catalytic activity is required. On the other hand, the petroleum resins usually contain 100 to 500 p.p.m. of sulfur compounds calculated as sulfur. Since sulfur acts as a catalyst poison and decreases the catalyst life, highly active catalysts are not always suitable and the poisoning resistance against sulfur is also an important factor for the catalyst used in the present invention.

The present inventors have found that platinum and/or rhodium supported on a suitable carrier or support satisfy the above-mentioned two requirements and produce satisfactory results. Platinum and/or rhodium may be employed in combination with at least one metal selected from the group consisting of palladium, ruthenium and rhenium. The addition of at least one of palladium, ruthenium and rhenium to platinum and/or rhodium is effective for extending the catalyst life by a heat resisting effect based on prevention of sintering of platinum and rhodium, though the catalytic activity is lowered somewhat as compared with the use of platinum and/or rhodium.

Although the mechanism for poisoning of a catalyst is not made clear in detail, in the present invention there is seen a large difference in poisoning between a platinum and/or rhodium catalyst and a nickel catalyst known as a hydrogenation catalyst. That is to say, in case of using a nickel catalyst, the catalyst absorbs sulfur in a very short period of time or reacts with sulfur to produce nickel sulfide, thus resulting in deterioration of the catalyst. In contrast to this, in case of using a platinum and/or rhodium catalyst, sulfur is converted into hydrogen sulfide by hydrocracking and hydrogen sulfide is removed with hydrogen gas from the catalyst bed. Thus, sulfur is not accumulated on the catalyst.

As stated above, in the present invention, there is employed as a catalyst material (I) at least one of platinum and rhodium or a combination of (I) at least one of platinum and rhodium with (II) at least one of palladium, ruthenium and rhenium. The catalyst material is supported on a suitable carrier in a known manner to provide a supported catalyst for use in a fixed bed. The amount of the catalyst material to be supported is from 0.2 to 10% by weight, preferably 0.5 to 5% by weight, based on the weight of the carrier. The above-mentioned metal (II) can be employed in an amount of at most 50% of the total weight of the metals (I) and (II).

The carriers for the catalyst material are not particularly limited. Porous carriers having a large surface area such as alumina, silica, carbon and titania are preferred.

The supported catalyst used in the process of the present invention may be in any shapes such as cylinder, extrusion, pellet and sphere. The spherical shape is particularly preferable. The smaller the size of the supported catalyst, the better because the catalyst size has an influence upon the effectiveness factor of the catalyst. In case of the spherical supported catalyst, the catalyst particles having a diameter of 0.3 to 8 mm., preferably 0.6 to 3 mm., are desirable in consideration of the pressure loss.

The hydrogenation of a petroleum resin is carried out by contacting hydrogen and the molten petroleum resin in the presence of the above-mentioned supported fixed bed catalyst. In the practice of the process of the invention, the supported catalyst particles are packed in the reaction zone of a vertical reactor, and the hydrogen gas and molten petroleum resin are passed through the fixed catalyst bed. The reaction conditions are suitably determined in consideration of the rate of hydrogenation as defined after, reaction time, reactor and the like. Usually, the reaction pressure is selected from 30 to 300 kg./cm$^2$., preferably 50 to 150 kg./cm$^2$., and the reaction temperature is selected from 200° to 350° C., preferably 230° to 320° C. The feed amount of hydrogen is from 2 to 50 times the theoretical amount of hdyrogen absorbed by the petroleum resin. The petroleum resin is usually fed so that the weight hourly space velocity (weight of petroleum resin fed per hour/weight of catalyst packed) falls within the range of 0.01 to 10, preferably 0.05 to 2.

In the present invention, it is necessary to pass hydrogen and the molten petroleum resin through the fixed catalyst bed in a parallel current manner. The hydrogen gas and the molten petroleum resin can be introduced from either the upper part or the lower part of a vertical reactor. In case of introducing the reactants from the upper part of the reactor, the so-called trickle bed system is preferably adopted. That is to say, the petroleum resin is molten at a high temperature and is made to fall down in such a manner that the liquid phase of the petroleum resin trickles down, thus forming a thin film of the petroleum resin on the surfaces of the catalyst particles. Thus, a continuous phase of hydrogen gas is efficiently brought into contact with the liquid phase and diffused. In case of introducing the reactants from the lower part of the reactor, the so-called vapor-liquid upward parallel flow current system is adopted. That is to say, the molten petroleum resin is introduced from the lower part of the reactor to the fixed catalyst bed, while hydrogen gas is introduced from the lower part of the reactor and is passed through the fixed catalyst bed in the form of fine bubbles. Thus, the petroleum resin is efficiently hydrogenated on the surfaces of the catalyst particles. The parallel downflow system is preferable since the catalytic efficiency between hydrogen and a catalyst is better. The effluent is introduced to a separator where the hydrogenated petroleum resin is separated from the hydrogen gas.

According to the process of the present invention, the reaction time can be shortened and moreover the rate of hydrogenation can be raised as compared with a conventional batchwise suspension bed system or flow type suspension bubble column system.

The present invention is more specifically described and explained by means of the following Examples in which all % are by weight unless otherwise noted. It is to be understood that the present invention is not limited to the Examples, and various changes and modifications may be made in the invention without departing from the spirit and scope thereof.

In the following Examples, the rate of hydrogenation indicates the value obtained by measuring the absorbances of a petroleum resin and the hydrogenation product thereof at a wavelength of 274.5 nm. by an ultraviolet spectrophotometer and calculating according to the following equation:

$$\text{Rate of hydrogenation } (\%) = (A-B)/A \times 100$$

wherein A is the absorbance of the starting petroleum resin and B is the absorbance of the hydrogenated petroleum resin.

EXAMPLE 1

A vertical reactor having a length of 2 m., an inner diameter of 26 mm. and an inner volume of 1 liter was employed. The reactor was provided on the outside with cast brass heaters divided into four sections so as to adjustably heat the reactor to maintain the inner temperature constant. The upper portion of the reactor was packed with 200 ml. of stainless steel packings for preheating, and the residual portion of the reactor was packed with 500 g. of spherical 2% platinum-alumina catalyst particles (made by Nippon Engelhard, Ltd.) having a particle size of 1.5 mm. The inner temperature and inner pressure of the reactor were maintained at 295° to 305° C. and 100 kg./cm$^2$., respectively, and the hydrogenation was carried out by feeding from the top of the reactor 150 Nl/hour of hydrogen gas and 150 g./hour of a petroleum resin (commericially available under the commercial name "Petrosin #120" made by Mitsui Petrochemical Industries, Ltd.) having a softening point of 120° C., a sulfur content of 150 p.p.m. and an aromatic ring content of 54%. The reaction effluent was then introduced to a separator to separate the hydrogenated petroleum resin and the hydrogen gas. The hydrogen gas was not circulated. The continuous operation was carried out to confirm the catalyst activity and the catalyst life, and the softening point and the rate of hydrogenation of the hydrogenated petroleum resin obtained after the elapse of a prescribed time were measured. The results are shown in Table 1.

TABLE 1

| Time elapsed (hour) | Softening point (°C.) | Rate of hydrogenation (%) |
|---|---|---|
| 10 | 113.0 | 99 |
| 100 | 110.0 | 93 |
| 500 | 109.0 | 90 |
| 1000 | 110.0 | 88 |
| 2000 | 109.0 | 88 |
| 3000 | 108.0 | 89 |
| 4000 | 105.0 | 70 |

It would be clear from Table 1 that deterioration of the catalyst is not seen and a high rate of hydrogenation of about 90% is maintained even after the continuous operation for 3,000 hours. It is observed that after 4,000 hours, the rate of hydrogenation lowers to 70%, thus the catalyst has a tendency to deterioration.

EXAMPLES 2 to 5

The procedures of Example 1 were repeated except that the supported fixed bed catalysts shown in Table 2 were employed instead of the supported platinum catalyst.

The results of the analysis of the obtained hydrogenated petroleum resins are shown in Table 2.

TABLE 2

| Ex. No. | Catalyst | Time elapsed (hour) | Softening point (°C.) | Rate of hydrogenation (%) |
|---|---|---|---|---|
| 2 | 2% rhodium-alumina | 10 | 114.0 | 99 |
|   |   | 100 | 109.5 | 90 |
|   |   | 1000 | 108.0 | 87 |
|   |   | 3000 | 107.0 | 86 |
|   |   | 4000 | 104.0 | 65 |
| 3 | 1% platinum-1% rhodium-alumina | 10 | 113.5 | 99 |
|   |   | 100 | 110.5 | 93 |
|   |   | 1000 | 109.0 | 89 |
|   |   | 3000 | 108.5 | 89 |
|   |   | 4000 | 106.0 | 67 |
| 4 | 1.75% platinum-0.25% ruthenium-alumina | 10 | 112.5 | 99 |
|   |   | 100 | 108.0 | 84 |
|   |   | 1000 | 106.0 | 83 |
|   |   | 3000 | 106.5 | 82 |
|   |   | 4000 | 106.0 | 81 |
| 5 | 1.75% platinum-0.25% palladium-alumina | 10 | 110.0 | 99 |
|   |   | 100 | 107.0 | 82 |
|   |   | 1000 | 105.0 | 80 |
|   |   | 3000 | 105.0 | 80 |
|   |   | 4000 | 104.5 | 79 |

It is observed in Table 2 that in Examples 2 and 3, the rate of hydrogenation lowers after 4,000 hours, thus the catalyst shows a tendency to deterioration. On the other hand, in Examples 4 and 5 in which a catalyst containing ruthenium or palladium is used, the rate of hydrogenation scarcely lowers even after the continuous operation for 4,000 hours, and it is clearly observed that the catalyst life is extended.

EXAMPLE 6

The same reactor as in Example 1 was employed. The lower portion of the reactor was packed with 200 ml. of stainless steel packings for preheating, and the residual upper portion of the reactor was packed with 500 g. of spherical 2% platinum-alumina catalyst particles (made by Nippon Engelhard, Ltd.) having a particle size of 1.5 mm. The inner temperature and inner pressure of the reactor were maintained at 295° to 305° C. and 100 kg./cm²., respectively. The hydrogenation was carried out by feeding from the bottom of the reactor 750 Nl/hour of hydrogen gas and 150 g./hour of a petroleum resin (commercially available under the commercial name "Petrosin #120" made by Mitsui Petrochemical Industries, Ltd.) to cause the hydrogen gas and the molten petroleum resin to flow upwardly. The reaction effluent was then introduced to a separator to separate the hydrogenated petroleum resin and the hydrogen gas. The recovered hydrogen gas was not circulated.

The results of the analysis of the obtained hydrogeneated petroleum resin are shown in Table 3.

TABLE 3

| Time elapsed (hour) | Softening point (°C.) | Rate of hydrogenation (%) |
|---|---|---|
| 10 | 113.0 | 99 |
| 100 | 110.0 | 90 |
| 500 | 109.0 | 80 |
| 1000 | 110.0 | 81 |
| 2000 | 109.0 | 79 |
| 3000 | 108.0 | 78 |
| 4000 | 105.0 | 60 |

As shown in Table 3, the catalyst scarcely deteriorates and a rate of hydrogenation of about 80% is maintained even after the continuous operation for 3,000 hours. It is observed that after 4,000 hours, the rate of hydrogenation lowers to about 60%, thus the catalyst shows a tendency to deterioration.

EXAMPLE 7

The procedure of Example 6 was repeated except that a 2% rhodium-alumina catalyst was employed instead of the supported platinum catalyst.

The results are shown in Table 4.

TABLE 4

| Time elapsed (hour) | Softening point (°C.) | Rate of hydrogenation (%) |
|---|---|---|
| 10 | 114.0 | 99 |
| 100 | 109.5 | 89 |
| 1000 | 108.0 | 79 |
| 3000 | 107.0 | 77 |
| 4000 | 104.0 | 57 |

It is observed in Table 4 that a rate of hydrogenation of about 80% is maintained even after the continuous operation for 3,000 hours, and that after 4,000 hours, the rate of hydrogenation lowers to about 60%, thus the catalyst shows a tendency to deterioration.

In addition to the ingredients used in the Examples, other ingredients can be used in the Examples as set forth in the specification to obtain substantially the same results.

What we claim is:

1. A process for preparing a hydrogenated petroleum resin which comprises parallel-currently passing hydrogen gas and a feed stock consisting essentially of petroleum resin having an aromatic ring in a molten state through a fixed bed of a supported catalyst containing as a catalytically active material a metal selected from the group consisting of platinum, rhodium, a combination thereof and a combination of at least one of platinum and rhodium with at least one of palladium, ruthenium and rhenium and withdrawing the hydrogenated petroleum resin from the fixed bed in a molten state.

2. The process of claim 1, wherein said hydrogen gas and said molten petroleum resin are introduced from the upper part of a vertical reactor to pass downwardly through the fixed bed in a parallel current manner.

3. The process of claim 1, wherein said hydrogen gas and said molten petroleum resin are introduced from the lower part of a vertical reactor to pass upwardly through the fixed bed in a parallel current manner.

4. The process of claim 1, wherein said hydrogen gas and said molten petroleum resin are introduced into a parallel-downflow fixed-bed reactor.

5. The process of claim 1, wherein said hydrogen gas and said molten petroleum resin are introduced into a parallel-upflow fixed-bed reactor.

6. A process for preparing a hydrogenated petroleum resin which comprises cocurrently passing hydrogen gas and a feed stock consisting essentially of petroleum resin having an aromatic ring in a molten state through a fixed bed of a supported catalyst in a reactor operating at a pressure of 30–300 Kg/cm$^2$, at a temperature of 200°–350° C., and with a hydrogen feed rate of 2 to 50 times the theoretical amount of hydrogen absorbed by the resin and a weight hour space velocity of the resin ranging from 0.01 to 10; said catalyst containing as a catalytically active material a metal selected from the group consisting of platinum, rhodium, a mixture of platinum and rhodium and a mixture of at least one of platinum and rhodium with no more than 50% of at least one of palladium, ruthenium and rhenium and withdrawing the hydrogenated petroleum resin in a molten state from said reactor.

7. The process of claim 6, wherein said hydrogen gas and said molten petroleum resin are introduced from the upper part of a vertical reactor to pass cocurrently downwardly through the fixed bed of the catalyst.

8. The process of claim 6, wherein said hydrogen gas and said molten petroleum resin are introduced from the lower part of a vertical reactor to pass cocurrently upwardly through the fixed bed of the catalyst.

9. The process of claim 6, wherein said hydrogen gas and said molten petroleum resin are introduced into a fixed bed containing particles containing 0.2 to 10% by weight of the active material supported on a carrier of alumina, silica, carbon or titania, based on the weight of the carrier.

10. The process of claim 9, wherein particles of the supported catalyst have a spherical shape with a diameter of 0.3 to 8 mm.

11. The process of claim 1, wherein the catalyst consists essentially of said catalytically active material supported on a porous carrier, the amount of the active material being from 0.2 to 10% by weight based on the weight of the carrier.

12. The process of claim 11, wherein said carrier is alumina, silica, carbon or titania.

13. The process of claim 6, wherein the hydrogenated petroleum resin exhibits a softening point ranging from 114° C. to 104° C.; whereas the initial molten petroleum resin has a softening point of 120° C.

* * * * *